UNITED STATES PATENT OFFICE.

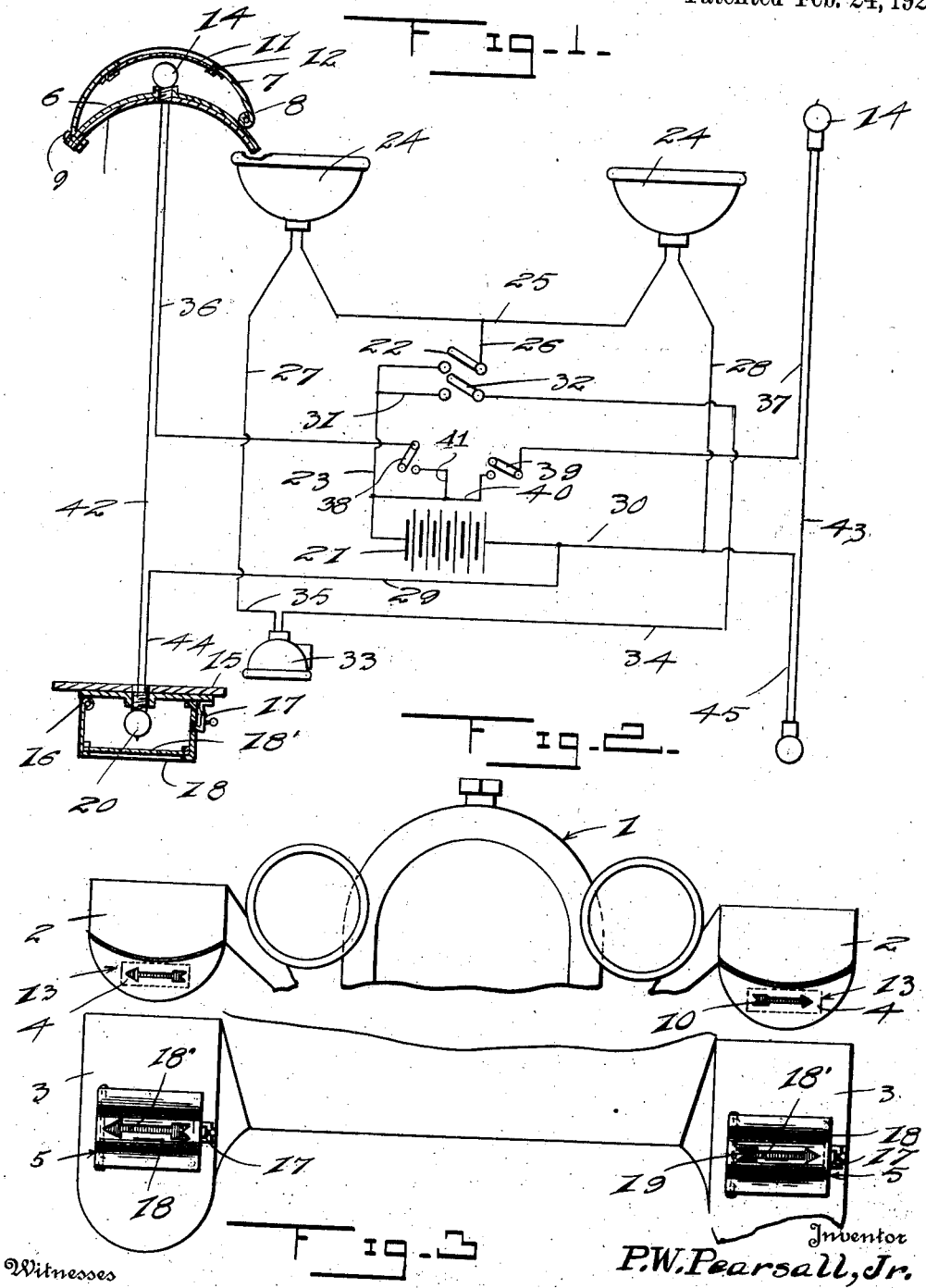

PERLY W. PEARSALL, JR., OF MUSKEGON, MICHIGAN.

ELECTRIC DIRECTION-INDICATOR FOR AUTOMOBILES.

1,331,965.　　　　　Specification of Letters Patent.　　Patented Feb. 24, 1920.

Application filed February 23, 1916, Serial No. 79,976. Renewed February 26, 1919. Serial No. 279,413.

*To all whom it may concern:*

Be it known that I, PERLY W. PEARSALL, Jr., a citizen of the United States, residing at Muskegon, in the county of Muskegon and State of Michigan, have invented certain new and useful Improvements in Electric Direction-Indicators for Automobiles; and I do hereby declare the following to be a full, clear, and exact description of the invention, such as will enable others skilled in the art to which it appertains to make and use the same.

This invention relates to new and useful improvements in an electrical direction indicator and one of its objects is the provision of a device of this character, which shall be simple, durable and efficient, and which may be manufactured and sold at a comparatively low cost.

Another object of this invention is to provide direction indicating casings secured to each of the front and rear fenders of an automobile to indicate approaching and following vehicles the intended turn to be made by the automobile, thus avoiding collisions caused by approaching and following vehicles not knowing the direction which the automobile is going to proceed, and further avoid the necessity of the operator of the automobile from putting his hand out of the side of the automobile to indicate to the traffic his intention of travel, which causes numerous accidents owing to the operator removing his hand from the steering wheel at a time when it is necessary to employ two hands in making a turn.

A further object of this invention is to provide the direction indicating casing of such construction which will not mar the lines of automobiles now upon the market and which may be illuminated by suitable electric lamps positioned within the casing and connected in circuit with the lighting or ignition system now employed upon automobiles.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a diagrammatical view of the electric lighting circuit of an automobile, illustrating the front and rear indicators in horizontal section, constructed in accordance with my invention, Fig. 2 is a fragmentary front elevation, illustrating the position of the front indicating casing, and Fig. 3 is a fragmentary rear elevation of an automobile illustrating the position of the rear direction indicating casing.

Referring in detail to the drawing, the numeral 1 indicates an automobile having front and rear mud guards or fenders 2 and 3 secured thereto, to which my invention is applied.

Referring specifically to my invention, it consists of direction indicating casings 4 and 5. The front direction indicating casings 4, having base plates 6, that are curved to conform to the contour of the mud guard and said plates have secured thereto curved plates 7, by hinges 8 and bolts 9. The curved plates are apertured to form arrows 10 in outline and are covered by a red glass 11 secured to the curved plates 7 as illustrated at 12. The base plates 6 are bolted or otherwise secured to the front fender 2 at any desired point, but preferably at a point indicated at 13, to place them in clear view to approaching vehicles or traffic in front of the automobile. The indicating casings 4 are illuminated by electric lamps 14, and controlled by a push button.

The rear indicating casing 5 consists of base plates 15, bolted or otherwise secured to the rear mud guard or fender 3, having secured thereto curved plates 18 by hinges 16 and spring catches 17. The curved plates 18 are apertured to form arrows 19, which are backed by red glass 18′. The indicating casings 5 are illuminated by electric lamps 20 that are controlled by a push button.

The electric lamps 14 and 20 are in circuit with the lighting system of the automobile. This system including the headlights 24 which are connected to a battery 21 by a wire 23, switch 22, and wires 26, 25. 27, 28, 29 and 30. It also includes a tail light 33 which is connected to the battery 21 by wires 23 and 31, switch 32, and wires 34, 35, 29 and 30.

The electric lamps 14 and 20 on the left hand side of the automobile are connected to the battery 21 by wires 23, 40 and 41, switch 38, and wires 36, 42, 29 and 30. The electric lamps 14 and 20 on the right hand side of the automobile are connected to the battery 21 by wires 23 and 40, switch 39 and wires 37, 43, 45 and 30.

While I have shown and described the preferred embodiment of my invention it will be understood that minor changes in construction, combination and arrangement of parts may be made without departing from the spirit and scope of the invention as claimed.

Having thus described my invention what I claim is:—

An indicator for automobiles comprising a hollow casing having a base shaped to conform to the contour of a mud guard of an automobile, a side element hinged at one side of the base and constituting the cover of said casing, a fastening element carried by said base and engaging said cover, a lamp socket formed centrally of said base, said cover having an opening in the form of a character disposed in advance of the lamp socket, and a colored panel closing said opening.

In testimony whereof I affix my signature in presence of two witnesses.

PERLY W. PEARSALL, Jr.

Witnesses:
SHERMAN M. PEARSALL,
MAURICE H. BAMAN.